United States Patent [19]

Dickinson et al.

[11] Patent Number: 4,746,710

[45] Date of Patent: May 24, 1988

[54] SHAPED ARTICLE FORMED FROM A BLEND OF A POLY(ARYL ETHER) AND A POLYCARBONATE AND/OR A POLYARYLATE

[75] Inventors: Barry L. Dickinson; Lloyd M. Robeson, both of Whitehouse Station, N.J.

[73] Assignee: Amoco Corporation, Chicago, Ill.

[21] Appl. No.: 773,113

[22] Filed: Sep. 6, 1985

[51] Int. Cl.$^4$ ............................................. C08L 67/00
[52] U.S. Cl. ..................................... 525/439; 525/394; 525/397; 525/905; 525/906; 525/937; 428/35
[58] Field of Search ............... 525/394, 397, 439, 462, 525/905, 906, 937; 428/35

[56] References Cited

U.S. PATENT DOCUMENTS

| | | | |
|---|---|---|---|
| 3,365,517 | 1/1968 | Barth | 525/471 |
| 4,286,075 | 8/1981 | Robeson et al. | 525/68 |

FOREIGN PATENT DOCUMENTS 0135779  4/1985  European Pat. Off.

*Primary Examiner*—Theodore E. Pertilla
*Attorney, Agent, or Firm*—Donald M. Papuga; William H. Magidson; Ralph C. Medhurst

[57] ABSTRACT

Described herein is a shaped article formed from a blend of a poly(aryl ether) resin and an aromatic polycarbonate resin and/or a polyacrylate resin. An article molded from such a blend has improved hydrolytic stability as compared with an article molded from the constituent components of the blend.

15 Claims, No Drawings

SHAPED ARTICLE FORMED FROM A BLEND OF A POLY(ARYL ETHER) AND A POLYCARBONATE AND/OR A POLYARYLATE

FIELD OF THE INVENTION

This invention is directed to a shaped article formed from a blend of a poly(aryl ether) resin and an aromatic polycarbonate resin and/or a polyarylate resin. An article molded from such a blend has improved hydrolytic stability as compared to averaged properties of the constituent components of the blend.

BACKGROUND OF THE INVENTION

Articles molded from aromatic polycarbonate resins are known to be unsatisfactory for use in hot, humid environments which include not only conditions of boiling water but also steam sterilization. (See C. A. Pryde et al, Polymer Eng. Sci., 22, 370 (1982); A. Ram et al, Poly. Eng. Sci., 25, 535 (1985); C. A. Pryde et al., J. Appl. Polym. Sci., 25, 2573 (1980); R. J. Gardner et al, J. Appl. Polym. Sci., 24, 1269 (1979); J. W. Shea et al, SPE 35th ANTEC, p. 326, Montreal, April, 1977 and L. M. Robeson et al, J. Appl. Polym. Sci, 28, 2925 (1983)). This is thought to be due to molecular weight reduction of the polycarbonate resin as a result of hydrolysis of the carbonate links in the polycarbonate and microcavity formation (specifically with multi-cycle steam sterilization conditions) which leads to structural flaws in the articles. On the other hand, articles molded from poly(aryl ether) resins have demonstrated excellent hydrolytic stability and therefore have utility in hot, humid environments including long term boiling water and multi-cycle steam sterilization.

One approach recently taken to improve the hydrolytic stability of articles molded from aromatic polycarbonate resin was to modify the polycarbonate resin by introduction of aromatic ester units (e.g., poly(ester-carbonates)). However, articles molded from poly(ester carbonate) resin are also significantly poorer in hot water and steam environments than articles molded from poly(aryl ether) resins. (See L. M. Robeson et al, paper presented at 2nd Annual Medical Plastics Conference (SPI), Washington, D.C. Sept. 10–11, 1984). However, slight improvements in the hydrolytic stability of articles molded from poly(ester carbonate) resin have been shown over articles molded from polycarbonate resin in steam sterilization environments presumably due to the higher glass transition temperature of the poly(ester carbonate) resin.

Blends of polyarylethers and polycarbonates are known from U.S. Pat. No. 3,365,517. The patent states that as a result of this blend, polycarbonate polymers are rendered more resistant to environmental stress crazing and cracking and their heat distortion temperatures are increased, and that thermoplastic polyarylene polyethers are rendered more resistant to thermal stress embrittlement.

However, this patent does not disclose or suggest that blends of poly(aryl ether) resins and polycarbonate resins can be used to form shaped articles which when exposed to moisture have improved hydrolytic stability.

THE INVENTION

This invention is directed to a shaped article formed by injection molding, extruding, thermoforming or blow molding a blend of a poly(aryl ether) resin and an aromatic polycarbonate resin and/or a polyarylate resin. The resultant article has a tensile impact strength as measured by ASTM D-1827 after 80 cycles of steam sterilization at 270° F. of >50 ft.-lbs./in.$^2$. Further, the resultant article has improved hydrolytic stability when exposed to hot, humid environments compared to articles molded from an aromatic polycarbonate resin.

It has been found that articles formed from blends of a poly(aryl ether) resin and an aromatic polycarbonate resin and/or a polyarylate resin exhibit synergistic behavior in hot water and steam sterilization environments in that the mechanical property retention is better than the average of the components. In some cases, specific properties of the articles are slightly better than articles formed from polysulfone resin alone, i.e., intermediate stages of steam sterilization cycling.

The poly(aryl ether) resin does not appear to prevent the hydrolysis of the polycarbonate resin but surprisingly diminishes the effect of hydrolysis on the loss of mechanical properties. The same behavior has also been noted with a blend of poly(aryl ether) resin and a polyarylate resin where the retention of properties of the blend in a hot humid environment is better than expected from the weight averaged values of the unblended constituents.

The Shaped Articles

The shaped articles into which the blend of poly(aryl ether) resin and aromatic polycarbonate resin and/or polyarylate resin can be formed include any articles which require hydrolytic stability due to their exposure to hot water or steam sterilization conditions. These articles include contact lens cases, test tubes, bottles, medical devices and instruments such as surgical staples and respirators, sterilizable instrument trays, waste containers, food service articles such as food processing equipment, cookware, including microwave cookware, and frozen food packaging and retort containers.

The Poly(aryl ether) resin

The poly(aryl ether) resin suitable for blending with the polycarbonate resin and/or poly arylate resin is a linear, thermoplastic polyarylene polyether containing recurring units of the following formula:

wherein E is the residuum of a dihydric phenol, and E' is the residuum of a benzenoid compound having an inert electron withdrawing group in at least one of the positions ortho and para to the valence bonds; both of said residua are valently bonded to the ether oxygens through aromatic carbon atoms. Such aromatic polyethers are included within the class of polyarylene polyester resins described in, for example, U.S. Pat. Nos. 3,264,536 and 4,175,175. It is preferred that the dihydric phenol be a weakly acidic dinuclear phenol such as, for example, the dihydroxyl diphenyl alkanes or the nuclear halogenated derivatives thereof, such as, for example, the 2,2-bis(4-hydroxyphenyl)propane, 1,1-bis(4-hydroxyphenyl)2-phenyl ethane,bis(4-hydroxyphenyl)methane, or their chlorinated derivatives containing one or two chlorines on each aromatic ring. Other materials also termed appropriately bisphenols are also highly valuable and preferred. These materials are the bisphenols of a symmetrical or unsymmetrical joining group, as, for example, ether oxygen (—O—), carbonyl sulfone 

or hydrocarbon residue in which the two phenolic nuclei are joined to the same or different carbon atoms of the residue.

Such dinuclear phenols can be characterized as having the structure:

$$HO(Ar-R_2-Ar_1)OH$$
with substituents $(R_1)_c$ and $(R'_1)_c$ wherein Ar and $Ar_1$ are aromatic groups preferably a phenylene group, $R_1$ and $R'_1$ can be the same or different inert substituent groups such as alkyl groups having from 1 to 4 carbons atoms, aryl, halogen atoms, i.e., fluorine, chlorine, bromine or iodine, or alkoxyl radicals having from 1 to 4 carbon atoms, the c's are independently integers having a value of from 0 to 4, inclusive, and $R_2$ is representative of a bond between aromatic carbon atoms as in dihydroxyl-diphenyl, or is a divalent radical, including for example, radicals such as

—O—, —S—, —SO—, —S—S—, —SO$_2$, and divalent hydrocarbon radicals such as alkylene, alkylidene, cycloalkylene, cycloalkylidene, or the halogen, alkyl, aryl or like substituted alkylene, alkylidene and cycloaliphatic radicals as well as aromatic radicals and rings fused to both Ar groups.

Examples of specific dihydric polynuclear phenols including among others: the bis-(hydroxyphenyl)alkanes such as
2,2-bis-(4-hydroxyphenyl)propane,
2,4'-dihydroxydiphenylmethane,
bis-(2-hydroxyphenyl)methane,
bis-(4-hydroxyphenyl)methane,
bis(4-hydroxy-2,6-dimethyl-3-methoxyphenyl)methane,
1,1-bis-(4-hydroxy-phenyl)ethane,
1,2-bis-(4-hydroxyphenyl)ethane,
1,1-bis-(4-hydroxy-2-chlorophenyl)ethane,
1,1-bis-(3-methyl-4-hydroxyphenyl)propane,
1,3-bis-(3-methyl-4-hydroxyphenyl)propane,
2,2-bis-(3-phenyl-4-hydroxyphenyl)propane,
2,2-bis-(3-isopropyl-4-hydroxyphenyl)propane,
2,2-bis-(2-isopropyl-4-hydroxyphenyl)propane,
2,2-bis-(4-hydroxy-naphthyl)propane,
2,2-bis-(4-hydroxyphenyl)pentane,
3,3-bis-(4-hydroxyphenyl)pentane,
2,2-bis-(4-hydroxyphenyl)heptane,
bis-(4-hydroxyphenyl)phenylmethane,
2,2-bis-(4-hydroxyphenyl)-1-phenyl-propane,
2,2-bis-(4-hydroxyphenyl)1,1,1,3,3,3,-hexafluoropropane, and the like;
di(hydroxyphenyl)sulfones such as bis-(4-hydroxyphenyl)sulfone, 2,4'-dihydroxydiphenyl sulfone, 5-chloro-2,4'-dihydroxydiphenyl sulfone, 5'-chloro-4,4'-dihydroxydiphenyl sulfone, and the like;
di(hydroxyphenyl)ethers such as bis-(4-hydroxyphenyl)ether, the 4,3'-, 4,2'-2,2'-2,3-,dihydroxyphenyl ethers, 4,4'-dihydroxyl-2,6-dimethyldiphenyl ether, bis-(4-hydroxy-3-isobutylphenyl)ether,
bis-(4-hydroxy-3-isopropylphenyl)ether,
bis-(4-hydroxy-3-chlorophenyl)ether,
bis-(4-hydroxy-3-fluorophenyl)ether,
bis-(4-hydroxy-3-bromophenyl)ether,
bis-(4-hydroxynaphthyl)ether,
bis-(4-hydroxy-3-chloronaphthyl)ether, and
4,4'-dihydroxyl-3,6-dimethoxydiphenyl ether.

As herein used the E' term defined as being the "residuum of the dihydric phenol" of course refers to the residue of the dihydric phenol after the removal of the two aromatic hydroxyl groups. Thus as is readily seen these polyarylene polyethers contain recurring groups of the residuum of the dihydric phenol and the residuum of the benzenoid compound bonded through aromatic ether oxygen atom.

Any dihalobenzenoid or dinitrobenzenoid compound or mixtures thereof can be employed in this invention which compound or compounds has the two halogens or nitro-groups bonded to benzene rings having an electron withdrawing group in at least one of the positions ortho and para to the halogen or nitro group. The dihalobenzenoid or dinitrobenzenoid compound can be either mononuclear where the halogens or nitro groups are attached to the same benzenoid rings or polynuclear where they are attached to different benzenoid rings, as long as there is an activating electron withdrawing group in the ortho or para position of that benzenoid nuclear. Fluorine and chlorine substituted benzenoid reactants are preferred; the fluorine compounds for fast reactivity and the chlorine compounds for their inexpensiveness. Fluorine substituted benzenoid compounds are most preferred, particularly when there is a trace of water present in the polymerization reaction system. However, this water content should be maintained below about 1% and preferably below 0.5% for best results.

An electron withdrawing group can be employed as the activator group in these compounds. It should be, of course, inert under the reaction conditions, but otherwise its structure is not critical. Preferred are the strong activating groups such as the sulfone group

bonding two halogen or nitro substituted benzenoid nuclei as in the 4,4'-dichlorodiphenyl sulfone and 4,4'-difluorodiphenyl sulfone, although such other strong withdrawing groups hereinafter mentioned can also be used with equal ease.

The more powerful of the electron withdrawing groups give the fastest reactions and hence are preferred. It is further preferred that the ring contain no electron supplying groups on the same benzenoid nucleus as the halogen or nitro group; however, the presence of other groups on the nucleus or in the residuum of the compound can be tolerated.

The activating group can be basically either of two types:

(a) monovalent groups that activate one or more halogens or nitro-groups on the same ring such as another nitro or halo group, phenylsulfone, or alkylsulfone, cyano, trifluoromethyl, nitroso, and hetero nitrogen, as in pyridine.

(b) divalent groups which can activate displacement of halogens on two different rings, such as the sulfone group

the carbonyl group

the vinylene group

the sulfoxide group

the azo group —N=N—; the saturated fluorocarbon groups

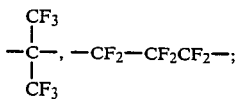

organic phosphine oxides

where $R_3$ is a hydrocarbon group, and the ethylidene group

where A can be hydrogen or halogen.

If desired, the polymers may be made with mixtures of two or more dihalobenzenoid or dinitrobenzenoid compounds. Thus, the E' residuum of the benzenoid compounds in the polymer structure may be the same or different.

It is seen also that as used herein, the E' term defined as being the "residuum of the benzenoid compound" refers to the aromatic or benzenoid residue of the compound after the removal of the halogen atom or nitro group on the benzenoid nucleus.

The poly(aryl ether) resins of this invention are prepared by methods well known in the art as for instance the substantially equimolar one-step reaction of a double alkali metal salt of dihydric phenol with a dihalobenzenoid compound in the presence of specific liquid organic sulfoxide or sulfone solvents under substantially anhydrous conditions. Catalysts are not necessary for this reaction.

The polymers may also be prepared in a two-step process in which a dihydric phenol is first converted in situ in the primary reaction solvent to the alkali metal salt of the reaction with the alkali metal, the alkali metal hydride, alkali metal hydroxide, alkali metal alkoxide or the alkali metal alkyl compounds. Preferably, the alkali metal hydroxide is employed. After removing the water which is present or formed, in order to secure substantially anhydrous conditions, the dialkali metal salts of the dihydric phenol are admixed and reacted with about stoichiometric quantities of the dihalobenzenoid or dinitrobenzenoid compound.

Additionally, the poly(aryl ether) resins may be prepared by the procedure described in, for example, U.S. Pat. No. 4,176,222 in which a substantially equimolar mixture of at least one bisphenol and at least one dihalobenzenoid are heated at a temperature of from about 100° to about 400° C. with a mixture of sodium carbonate or bicarbonate and a second alkali metal carbonate or bicarbonate having a higher atomic number than that of sodium.

Further, the poly(aryl ether) resins may be prepared by the procedure described in Canadian Pat. No. 847,963 wherein the bisphenol and dihalobenzenoid compound are heated in the presence of potassium carbonate using a high boiling solvent such as diphenylsulfone.

Preferred poly(aryl ether) resins of this invention are those prepared using the dihydric polynuclear phenols of the following four types, including the derivatives thereof which are substituted with inert substituent groups

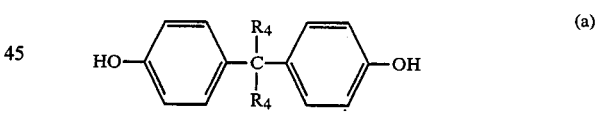

(a)

in which the $R_4$ groups represent independently hydrogen, lower alkyl, aryl and the halogen substituted groups thereof, which can be the same or different;

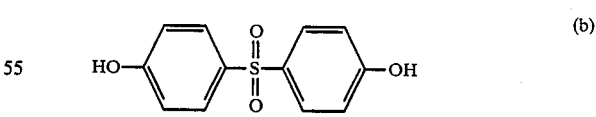

(b)

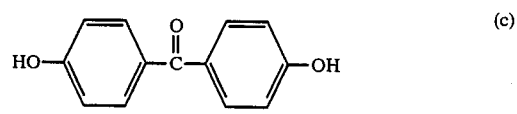

(c)

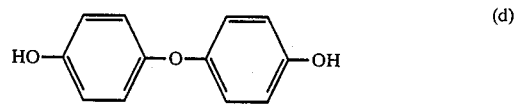

(d)

and substituted derivatives thereof.

It is also contemplated in this invention to use a mixture of two or more different dihydric phenols to accomplish the same ends as above. Thus when referred to above the —E— residuum in the polymer structure can actually be the same or different aromatic residue.

The poly(aryl ether)s have a reduced viscosity of from about 0.35 to about 1.5 as measured in an appropriate solvent at an appropriate temperature depending on the particular poly(aryl ether); such as in methylene chloride at 25° C.

The preferred poly(aryl ether)s have repeating units of the formula:

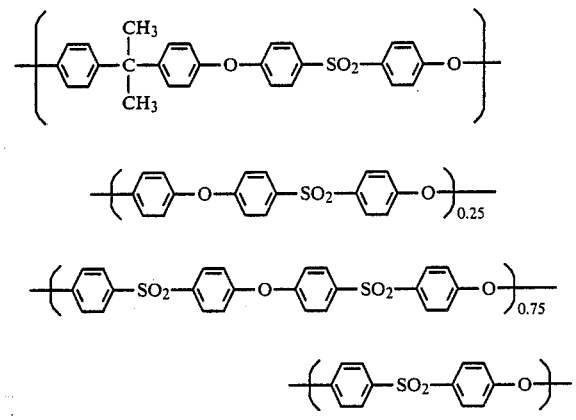

The Aromatic Polycarbonate

The thermoplastic aromatic polycarbonate resins that can be employed herein are homopolymers and copolymers and mixtures thereof, which have an intrinsic viscosity of from about 0.4 to about 1.0 dl./g. as measured in methylene chloride at 25° C. The polycarbonates are prepared by reacting a dihydric phenol with a carbonate precursor. Typical of some of the dihydric phenols that may be employed are bisphenol-A, bis(4-hydroxyphenyl)methane, 2,2-bis(4-hydroxy-3-methylphenyl)propane, 4,4-bis(4-hydroxyphenyl)heptane, 2-2-(3,5,3′,5′tetrabromo-4,4′-dihydroxydiphenyl)propane, (3,3′dichloro-4,4′dihydroxydiphenyl)methane, and the like. Other dihydric phenols of the bisphenol type are described in, for example, U.S. Pat. Nos. 2,999,835, 3,028,365 and 3,334,154.

It is, of course, possible to employ two or more different dihydric phenols or a copolymer of a dihydric phenol with a glycol or with hydroxy or acid terminated polyesters.

The carbonate precursor may be either a carbonyl halide, a carbonate ester, or a haloformate. The carbonyl halides which can be employed herein are carbonyl bromide, carbonyl chloride and mixtures thereof. Typical of the carbonate esters which may be employed herein are diphenyl carbonate, di-(halophenyl)carbonates, such as di-(chlorophenyl)carbonate or di-(bromophenyl)carbonate, etc., di-(alkylphenyl)carbonates such as di(tolyl)carbonate, di(naphthyl)carbonate, di(-chloronaphthyl)carbonate, etc. or mixtures thereof. The haloformates suitable for use herein include bis-haloformate of dihydric phenols for example, bischloroformates of bisphenol-A, of hydroquinone, etc. or glycols for example, bishaloformates of ethylene glycol, neopentyl glycol, polyethylene glycol, etc. While other carbonate precursors will be apparent to those skilled in the art, carbonyl chloride, also known as phosgene, is preferred.

The aromatic polycarbonate polymers may be prepared by methods well known in the art by using phosgene or a haloformate and by employing a molecular weight regulator, an acid acceptor and a catalyst. The molecular weight regulators which can be employed in carrying out the process include monohydric phenols, such as phenol, para-tertiary-butylphenol, para-bromophenol, primary and secondary amines, etc. Preferably, a phenol is employed as the molecular weight regulator.

A suitable acid acceptor may be either an organic or an inorganic acid acceptor. A suitable organic acid acceptor is a tertiary amine and includes materials, such as pyridine, triethylamine, dimethylaniline, tributylamine, etc. The inorganic acid acceptor may be one which can be either a hydroxide, a carbonate, a bicarbonate, or a phosphate of an alkali or alkaline earth metal.

The catalysts which are employed herein can be any of the suitable catalysts that aid the polymerization of, for example, bisphenol-A with phosgene. Suitable catalysts include tertiary amines, such as triethylamine, tripropylamine, N,N-dimethylaniline, quaternary ammonium compounds, such as tetraethylammonium bromide, cetyl triethyl ammonium bromide, tetra-n-heptylammonium iodide, and quaternary phosphonium compounds, such as n-butyltriphenyl-phosphonium bromide and methyl-triphenyl phosphonium bromide.

The polycarbonates can be prepared in a one-phase (homogeneous solution) or a two-phase (interfacial) systems when phosgene, or a haloformate are used. Bulk reactions are possible when the diarylcarbonate precursors are used.

Also, aromatic polyester carbonates may be used. These are described in, for example, U.S. Pat. No. 3,169,121. The preferred polyester carbonate results from the condensation of phosgene, terephthaloyl chloride, isophthaloyl chloride with bisphenol-A and a small amount of p-tertbutylphenol.

The Polyarylate Resins

The polyarylate resins which are suitable for use in this invention are derived from a dihydric phenol and at least one aromatic dicarboxylic acid and have a reduced viscosity of from about 0.4 to greater than about 1.0, preferably from about 0.6 to about 0.8 dl/gm, as measured in chloroform (0.5 g/100 ml chloroform) or other suitable solvent at 25° C.

A particularly desirable dihydric phenol is of the following formula:

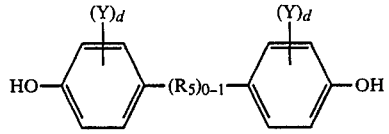

wherein Y is independently selected from, hydrogen, alkyl groups of 1 to 4 carbon atoms, chlorine or bromine, each d, independently, has a value of from 0 to 4, inclusive, and $R_5$ is a divalent saturated or unsaturated aliphatic hydrocarbon radical, particularly an alkylene or alkylidene radical having from 1 to 6 carbon atoms, or a cycloalkylidene or cycloalkylene radicals having up to and including 9 carbon atoms, O, CO, $SO_2$, or S. The dihydric phenols may be used individually or in combination.

The dihydric phenols that may be used in this invention include the following:
2,2-bis-4(4-hydroxyphenyl)propane;
bis-(2-hydroxyphenyl)methane,
bis-(4-hydroxyphenyl)methane,
bis-(4-hydroxy-2,6-dimethyl-3-methoxyphenyl)methane,
1,1-bis-(4-hydroxyphenyl)ethane,
1,2-bis-(4-hydroxyphenyl)ethane,
1,1-bis-(4-hydroxy-2-chlorophenyl)ethane,
1,3-bis-(3-methyl-4-hydroxyphenyl)ethane,
1,3-bis-(3-methyl-4-hydroxyphenyl)propane,
2,2-bis-(3-phenyl-4-hydroxyphenyl)propane,
2,2-bis-(3-isopropyl-4-hydroxyphenyl)propane,
2,2-bis-(2-isopropyl-4-hydroxyphenyl)propane,
2,2-bis-(4-hydroxyphenyl)pentane,
3,3-bis-(4-hydroxyphenyl)pentane,
2,2-bis-(4-hydroxyphenyl)heptane,
1,2-bis-(4-hydroxyphenyl)1,2-bis-(phenyl)propane,
4,4'-(dihydroxyphenyl)ether,
4,4'-(dihydroxyphenyl)sulfide,
4,4'-(dihydroxyphenyl)sulfone,
4,4'-(dihydroxyphenyl)sulfoxide,
4,4'-(dihydroxybenzophenone), and
naphthalene diols The aromatic dicarboxylic acids that may be used in this invention include terephthalic acid, isophthalic acid, any of the naphthalene dicarboxylic acids and mixtures thereof, as well as alkyl substituted homologs of these carboxylic acids, wherein the alkyl group contains from 1 to about 4 carbon atoms, and acids containing other inert substituents, such as halides, alkyl or aryl ethers, and the like. Acetoxybenzoic acid can also be used. Preferably, mixtures of isophthalic and terephthalic acids are used. The isophthalic acid to terephthalic acid ratio in the mixtures is about 0:100 to about 100:0, while the most preferred acid ratio is about 75:25 to about 50:50. Also, from about 0.5 to about 20 percent of aliphatic diacids containing from 2 to about 10 carbon atoms, such as adipic acid, sebacic acid, and the like may be additionally used in the polymerization reaction.

The polyarylates can be prepared by any of the well known prior art polyester forming reactions, such as the reaction of the acid chlorides of the aromatic dicarboxylic acids with the dihydric phenols; the reaction of the diaryl esters of the aromatic dicarboxylic acids with the dihydric phenols; or the reaction of the aromatic diacids with diester derivatives of the dihydric phenol. These processes are described in, for example, U.S. Pat. Nos. 3,317,464; 3,948,856; 3,780,148; 3,824,213; and 3,133,898.

The polyarylates are preferably prepared by the process as set forth in U.S. Pat. No. 4,321,355. This process comprises the following steps:

(a) reacting an acid anhydride derived from an acid containing from 2 to 8 carbon atoms with at least one dihydric phenol to form the corresponding diester; and (b) reacting said diester with at least one aromatic dicarboxylic acid at a temperature sufficient to form the polyarylate, wherein the improvement comprises removing residual acid anhydride after formation of the dihydric phenol diester so that is concentration is less than about 1500 parts per million.

The acid anhydride suitable is derived from an acid containing from 2 to 8 carbon atoms. The preferred acid anhydride is acetic anhydride.

The dihydric phenol is described above.

Generally, the dihydric phenol reacts with the acid anhydride under conventional esterification conditions to form the dihydric phenol diester. The reaction may take place in the presence or absence of a solvent. Additionally, the reaction may be conducted in the presence of a conventional esterification catalyst or in the absence thereof.

The blends contain from about 30 to about 80, preferably from about 35 to about 70 wt. percent of the poly(aryl ether) and from about 70 to about 20, preferably from about 65 to about 30 wt. percent of the aromatic polycarbonate or the polyarylate, or combinations thereof.

Other Additives

Other additives which may be used in combination with the blends include mineral fillers such as carbonates including chalk, calcite and dolomite; silicates including mica, talc, wollastonite; silicon dioxide; glass spheres; glass powders; aluminum; clay, quartz; and the like. Additional additives include fibers such as glass fibers and carbon fibers; pigments, such as titanium dioxide; thermal stabilizers such as zinc oxide; ultraviolet light stabilizers, plasticizers, and the like.

Fabrication

The blends, and one or more optional additives are generally compounded in an extruder. The compounding is carried out at temperatures of from about 200° C. to about 400° C. The compounded material may be pelletized by conventional techniques.

The compounded material may be shaped into the desired article by conventional molding techniques such as by injection molding, compression molding, thermoforming, or blow molding. Preferably, the compounded material is extruded into a film or sheet and then thermoformed into the desired article by methods well known in the art.

The blends either alone or in combination with other materials may be fed in particulate form (such as pellets, granules, particles, powders, and the like) into an extruder which extrudes the material into film or sheet form. The extruders which are used to form sheet from either the compounded materials or individual ingredients are well known in the art. Typically, the extruder may be a 1½ inch Sterling extruder containing an extruder screw with a length to diameter ratio of 24 to 1 and a Maddock mixing flute. The Maddock mixing flute is of the type which is described in U.S. Pat. No. 3,730,493. Such a mixing head or section is referred to as a fluted mixing head of the outside-in-type indicating that the passage of material is from the outside flutes through radial passages to a central axial internal passage from which it is discharged through the downstream end of the mixing section.

The blends are generally formed into a sheet at a temperature of from about 550° to about 600° F. The sheet is extruded horizontally from a die. One of the die jaws is adjustable to permit minor changes in the die openings to maintain close control on sheet gauge uniformity. The takeoff unit for the sheet usually comprises a vertical stack of three driven highly polished plated rolls. The material passes over and under the middle roll and around the bottom roll. The upper and lower rolls may be adjusted in vertical position, but the middle roll is stationary. The top roll can be used to polish the sheet as it passes over the middle roll. The sheet is then passed through a cutter where it is cut to the desired length. The sheet can vary in thickness depending on the thickness of the end product desired. Generally, the thickness of the sheet is from about 10 to about 25 mils.

The sheet or laminate may be then thermoformed into the shape of the desired article. Thermoforming may be accomplished by methods well known in the art such as those described in, for example, Engineering Polymer Science and Technology, Volume 13, 1971, pages 832-843. Generally, the sheet is vacuum formed into a female mold. In this process, the sheet is locked in a frame around its periphery only, is heated to a predetermined temperature for a predetermined time and then brought into contact with the edge of the mold. This contact creates a seal so that it is possible to remove the air between the hot sheet and the mold, allowing atmospheric pressure to force the hot sheet against the mold. Also, the sheet may be draped manually to the required contour of a female mold, such as to make a seal possible. Positive air pressure may also be applied against the top of the sheet to force it into a female mold as an alternative to vacuum forming.

EXAMPLES

The following examples serve to give specific illustrations of the practice of this invention but they are not intended in any way to limit the scope of this invention.

The following designations used in the Examples have the following meaning:

Polysulfone: A polymer having the following repeating unit:

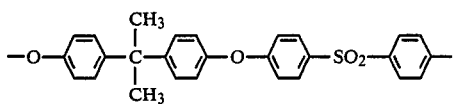

This polymer has a reduced viscosity of 0.47 dl/g as measured in chloroform (0.1 g/100 ml) at 25° C. (Udel P-1700 polysulfone sold by Union Carbide Corp.).

Polycarbonate: an aromatic bisphenol-A polycarbonate (Lexan 101 sold by General Electric Co.) having a reduced viscosity of 0.64 as measured in chloroform at 25° C.

Polyestercarbonate: an bisphenol-A based poly(estercarbonate) with an ester/carbonate mole ratio of 40/60; a tere/iso ratio of 30/70 and a reduced viscosity of 0.59 as measured in chloroform (0.1 g./100 ml) at 25° C. (Lexan 4501 sold by General Electric).

Polyarylate: (Ardel D-100 sold by Union Carbide Corp.) prepared from bisphenol-A and a mixture of 50 mole percent each of isophthalic and terephthalic acid chlorides and having a reduced viscosity of 0.66 as measured in p-chlorophenol at 49° C. (0.2 g/100 ml).

Control A

The Polycarbonate was dried prior to injection molding. The Polycarbonate was injection molded in a Newbury Injection molding machine at 270°-290° into test specimens (0.125 inch thick, 0.5 inch wide tensile and flexure bars) and tested according to the following ASTM procedures:

| Tensile Impact Strength | D-1822 |
| Notched Izod Impact Strength | D-256 |
| Tensile Modulus | D-638 |
| Tensile Strength | D-638 |

The specimens were then subjected to a hot water immersion test which utilized a Markson water bath at 96° C. The steam sterilization cycling utilized two Vernitron Steam Sterilizer Units (Models 8020 and 8080). The test specimens for sterilization studies were initially cleaned with isopropanol to remove surface contaminants followed by placing in a criss-cross or random fashion in the units to assure good steam exposure. The steam pressure was raised to 27 psig (270° F.) and held for 30 minutes. The pressure was released and samples were removed for at least one hour exposure to ambient conditions. The samples were removed after every 20 cycles of mechanical property determination.

Additionally, specimens of dimensions 2.75×3.5×0.125 inches were tested by dropping a 15 lb. dart with a 1 inch diameter impact head according to a procedure termed "Increasing Stair-Step Dart Drop". This procedure involved using the same specimen. The dart was first dropped at ½ ft. height. If no failure occurred, the height was increased to 1 ft. and retested. The procedure was repeated at increasing 1 ft. intervals until failure was observed. The height obtained just prior to failure times the 15 lb. dart weight was reported as the falling dart impact strength.

The results for Polycarbonate are shown in Tables 1 and 4.

Control B

The Polysulfone was injection molded into test specimens as described in Control A and tested by the procedures described in Control A. The results are shown in Tables 1, 2, 4 and 5.

Control C

The Polyestercarbonate was injection molded into test specimens as described in Control A and tested by the procedures described in Control A. The results are shown in Tables 2 and 5.

EXAMPLE 1

50 wt. percent of the Polycarbonate of Control A and 50 wt. percent of the Polysulfone of Control B were extruded from predried, premixed pellets at 280°-290° C. in a 1 inch Killion extruder followed by dicing into pellets. The pellets were injection molded and tested by the procedure described in Control A. The results are shown in Tables 3, 4, 5, and 6.

EXAMPLE 2

49.5 wt. percent of the Polycarbonate of Control A was blended with 49.5 wt. percent of the Polysulfone of Control B and 1 wt. percent of titanium dioxide by the procedure described in Example 1. The resultant pellets were injection molded and tested by the procedure described in Control A. The results are shown in Table 3.

EXAMPLE 3

99 wt. percent of the Polyestercarbonate of Control C was blended with 1 wt. percent of titanium dioxide by the procedure described in Example 1. The resultant pellets were injection molded and tested by the procedure described in Control A. The results are shown in the Table 3.

Control D

The Polyarylate was injection molded into test specimens as described in Control A and tested by the steam sterilization procedure described in Control A. The samples were also subjected to boiling water exposure using a Boekel hot water bath.

The results are shown in Table 7.

EXAMPLE 4

80 wt. % of the Polysulfone of Control B and 20 wt. % of the Polyarylate of Control D were blended in a Killion extruder at 300° C. followed by dicing into pellets. The pellets were injection molded and tested for steam sterilization and boiling water testing. The steam sterilization procedure was equivalent to that of Control A. The results are shown in Table 7.

EXAMPLE 5

60 wt. % of the Polysulfone of Control B and 40 wt. % of the Polyarylate of Control D were blended as described in Example 4. The samples were tested as described in Example 4. The results are shown in Table 7.

EXAMPLE 6

40 wt. % of the Polysulfone of Control B and 60 wt. % of the Polyarylate of Control D were blended as described in Example 4. The samples were tested as described in Example 4. The results are shown in Table 7.

EXAMPLE 7

40 wt. % of the Polysulfone of Control B and 59 wt. % of the Polycarbonate of Control A were blended with 1% titanium dioxide as described in Example 2. The samples were injection molded and subjected to steam sterilization cycling as described in Control A. The results are shown in Table 8.

TABLE 1

MECHANICAL PROPERTY RETENTION DATA

| | Hours at 96° C. Water Immersion | | | | | |
|---|---|---|---|---|---|---|
| | 0 | 200 | 548 | 1056 | 1608 | 2232 |
| Polycarbonate | | | | | | |
| Tensile Modulus (psi) | 333,000 | 350,000 | 372,000 | 357,000 | 384,000 | 436,000 |
| Tensile Strength (psi) | 10,400 | 10,000 | 10,300 | 9,950 | 5,800 | 1,560 |
| Elongation % | 132 | 8 | 5.4 | 4.4 | 1.7 | 0.40 |
| Tensile Impact Strength (ft.-lbs./in.$^2$) | 220 | 104 | 87 | 68 | 3 | 6 |
| Polysulfone | | | | | | |
| Tensile Modulus (psi) | 370,000 | 401,000 | 418,000 | 400,000 | 409,000 | 416,000 |
| Tensile Strength (psi) | 10,500 | 11,400 | 11,700 | 11,400 | 11,600 | 11,800 |
| Elongation % | 130 | 45 | 25 | 22 | 10.7 | 13.3 |
| Tensile Impact Strength (ft.-lbs./in.$^2$) | 153 | 126 | 127 | 104 | 91 | 100 |

TABLE 2

MECHANICAL PROPERTY RETENTION DATA

| | Hours at 96° C. Water Immersion | | | | | | | |
|---|---|---|---|---|---|---|---|---|
| | 0 | 176 | 272 | 410 | 600 | 896 | 1200 | 1976 |
| Poly(ester-carbonate) | | | | | | | | |
| Tensile Modulus (psi) | 320,000 | 329,000 | 331,000 | 335,000 | 341,000 | 344,000 | 349,000 | 409,000 |
| Tensile Strength (psi) | 9,850 | 9,980 | 10,100 | 10,200 | 9,220 | 5,920 | 3,110 | 1,130 |
| Elongation % | 85 | 43 | 14 | 10.9 | 3.6 | 1.8 | 1.5 | 0.30 |
| Tensile Impact Strength (ft.-lbs./in.$^2$) | 120 | 81 | 87 | 82 | 97 | 74 | 6 | 1 |
| Polysulfone | | | | | | | | |
| Tensile Modulus (psi) | 371,000 | 395,000 | 396,000 | 407,000 | 406,000 | 405,000 | 398,000 | 395,000 |
| Tensile Strength (psi) | 10,600 | 11,500 | 11,400 | 11,400 | 11,800 | 11,700 | 11,500 | 11,400 |
| Elongation % | 123 | 56 | 45 | 12.5 | 23 | 13 | 8.3 | 9.7 |
| Tensile Impact Strength (ft.-lbs./in.$^2$) | 130 | 106 | 108 | 87 | 95 | 86 | 78 | 74 |

TABLE 3

| | Hours at 96° C. Water Immersion | | | | | | |
|---|---|---|---|---|---|---|---|
| Sample Description | 0 | 190 | 406 | 650 | 900 | 1140 | 1430 | 1698 |
| Example 1 50% Polysulfone 50% Polycarbonate | | | | | | | | |
| Tensile Modulus (psi) | 346,000 | 355,000 | 367,000 | 370,000 | 361,000 | 372,000 | 384,000 | 389,000 |
| Tensile Strength (psi) | 10,300 | 10,400 | 10,700 | 11,000 | 11,100 | 11,300 | 9,550 | 10,500 |
| Elongation % | 142 | 58 | 12.5 | 19 | 5.7 | 5.2 | 3.7 | 3.3 |
| Tensile Impact Strength (ft.-lbs./in.$^2$) | 158 | 130 | 102 | 106 | 73 | 83 | 91 | 11 |
| Example 2 49.5% Polysulfone 49.5% Polycarbonate 1% TiO$_2$ | | | | | | | | |
| Tensile Modulus (psi) | 346,000 | 362,000 | 362,000 | 368,000 | 365,000 | 370,000 | 382,000 | 388,000 |
| Tensile Strength (psi) | 9,530 | 10,400 | 10,600 | 10,600 | 10,800 | 10,900 | 10,900 | 10,600 |
| Elongation % | 95 | 7.7 | 4.9 | 4.4 | 4.8 | 4.5 | 4.5 | 5.4 |
| Tensile Impact Strength (ft.-lbs./in.$^2$) | 118 | 97 | 77 | 70 | 39 | 16 | 23 | 21 |

TABLE 3-continued

| | Hours at 96° C. Water Immersion | | | | | | | |
|---|---|---|---|---|---|---|---|---|
| Sample Description | 0 | 190 | 406 | 650 | 900 | 1140 | 1430 | 1698 |
| Example 3 99% Polyestercarbonate 1% TiO$_2$ | | | | | | | | |
| Tensile Modulus (psi) | 305,000 | 326,000 | 332,000 | 345,000 | 342,000 | 359,000 | 358,000 | * |
| Tensile Strength (psi) | 9,350 | 9,810 | 10,200 | 8,440 | 6,220 | 2,370 | 979 | * |
| Elongation % | 95 | 8.5 | 6.3 | 2.8 | 1.9 | 0.7 | 0.3 | * |
| Tensile Impact Strength (ft.-lbs./in.$^2$) | 112 | 79 | 45 | 16 | 1 | 2 | * | * |

*Too brittle to test

TABLE 4
MECHANICAL PROPERTY DATA AFTER STEAM STERILIZATION

| | Sterilization Cycles | | | | | |
|---|---|---|---|---|---|---|
| | 0 | 20 | 40 | 60 | 80 | 100 |
| Polysulfone | | | | | | |
| Tensile Strength (psi) | 10,500 | 12,100 | 12,200 | 12,300 | 12,400 | 13,000 |
| Tensile Impact Strength (ft.-lbs./in.$^2$) | 153 | 105 | 113 | 91 | 98 | 87 |
| Polycarbonate | | | | | | |
| Tensile Strength (psi) | 10,400 | 9,300 | 9,500 | 9,180 | 9,070 | 5,290 |
| Tensile Impact Strength (ft.-lbs./in.$^2$) | 220 | 79 | 78 | 9 | 5 | 3 |
| Example 1 50% Polysulfone 50% Polycarbonate | | | | | | |
| Tensile Strength (psi) | 9,600 | 10,500 | 10,900 | 10,900 | 10,700 | 11,300 |
| Tensile Impact Strength (ft.-lbs./in.$^2$) | 132 | 101 | 82 | 107 | 84 | 76 |

TABLE 5
FALLING DART IMPACT STRENGTH AFTER STEAM STERILIZATION

| | Steam Sterilization Cycles | | | | | |
|---|---|---|---|---|---|---|
| Sample | 0 | 20 | 40 | 60 | 80 | 100 |
| Polysulfone Dart Drop Impact (ft.-lbs.) | 75 | — | 60 | 45 | 60 | 30 |
| Example 1 50% Polysulfone 50% Polycarbonate Dart Drop Impact (ft.-lbs.) | 75 | 60 | 60 | 60 | 45 | 45 |
| Polyestercarbonate Dart Drop Impact (ft.-lbs.) | 75 | 45 | 15 | 0 | 0 | — |

TABLE 6
PROPERTY DATA ON 50/50 POLYSULFONE/POLYCARBONATE BLEND AFTER STEAM STERILIZATION CYCLES

| | Steam Sterilization Cycles | | | | | |
|---|---|---|---|---|---|---|
| | 0 | 20 | 40 | 60 | 80 | 100 |
| Notched Izod Impact Strength ft.-lbs./in. of notch | 1.47 | 1.24 | 1.33 | 1.20 | 1.34 | 1.10 |
| Melt Flow 375° C. dg/min. | 23 | 33 | 29 | 30 | 38 | 43 |

TABLE 7
POLYARYLATE/POLYSULFONE BLEND PROPERTY RETENTION

| Composition | Example 4 80% Polysulfone 20% Polyarylate | Example 5 60% Polysulfone 40% Polyarylate | Example 6 40% Polysulfone 60% Polyarylate | Control D 100% Polyarylate |
|---|---|---|---|---|
| Initial Tensile Strength (psi) | 9,600 | 10,000 | 9,900 | 10,000 |
| Tensile Strength after 89 steam sterilization cycles | 11,250 | 8,650 | 5,200 | TBTT |
| Tensile Strength after 5 weeks in boiling water | 9,650 | 9,350 | 6,100 | TBTT |

TBTT = too brittle to test

TABLE 8
Mechanical Property Retention for Example 7 (40% Polysulfone/59% Polycarbonate/1% TiO$_2$). Exposed to Steam Sterilization cycling.

| Steam Sterilization Cycle | Tensile Impact Strength (ft. lbs./in.$^2$) | Tensile Strength (psi) |
|---|---|---|
| 0 | 131 | 9,350 |
| 20 | 111 | 10,100 |
| 40 | 95 | 10,100 |

TABLE 8-continued

Mechanical Property Retention for Example 7
(40% Polysulfone/59% Polycarbonate/1% TiO$_2$).
Exposed to Steam Sterilization cycling.

| Steam Sterilization Cycle | Tensile Impact Strength (ft. lbs./in.$^2$) | Tensile Strength (psi) |
|---|---|---|
| 60 | 66 | 10,100 |
| 80 | 94 | 10,400 |
| 100 | 20 | 10,200 |

Discussion of the Data

The comparison of polysulfone and polycarbonate is given in Table 1 for continuous exposure at 95° C. Data for poly(ester carbonate) are given in Table 2 versus polysulfone. This data clearly demonstrate the superior retention of polysulfone over both polycarbonate and poly(ester carbonate). The results for a poly(ester carbonate) and 1% of TiO$_2$, a 50/50 blend of polysulfone/polycarbonate and a 50/50 blend of the same polysulfone/polycarbonate and 1% TiO$_2$ are given in Table 3.

The steam sterilization results for polysulfone and polycarbonate as a function of sterilization cycle are given in Table 4. Data on the 50/50 polysulfone/polycarbonate blend are also given. The falling dart impact strengths after steam sterilization cycling for polysulfone, poly(ester carbonate), and the 50/50 polysulfone/polycarbonate blend are listed in Table 5. The notched izod impact strength and melt flow data after steam sterilization are listed in Table 6 for the 50/50 polysulfone/polycarbonate blend.

The tensile strength retention results for polysulfone/polyarylate blends are given in Table 7 after several hot, humid environmental exposure conditions. The steam sterilization results on a 40% polysulfone/59% polycarbonate/1% TiO$_2$ blend are given in Table 8.

The results for the blends of polysulfone/polycarbonate and polysulfone/polyarylate after exposure to hot, humid environments show marked improvement over polycarbonate or polyarylate and even significantly better than the weight-averaged properties of the unblended constituents.

What is claimed is:

1. A shaped article having a tensile impact strength as measured by ASTM D-1822 after 80 cycles of steam sterilization at 270° F. of greater than 50 ft.-lbs./in.$^2$ formed from a blend consisting essentially of a poly(aryl ether) resin and a polyarylate resin wherein said poly(aryl ether) resin comprises from about 30 to about 80 weight percent of the article.

2. An article as defined in claim 1 wherein the poly(aryl ether) resin contains recurring units of the formula:

—O—E—O—E'— wherein E is the residuum of a dihydric phenol, and E' is the residuum of a benzenoid compound having an inert electron withdrawing group in at least one of the positions ortho and para to the valence bonds; both of said residua are valently bonded to the ether oxygens through aromatic carbon atoms.

3. An article as defined in claim 2 wherein the dihydric phenol has the following structure:

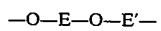
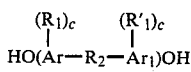

wherein Ar and Ar$_1$ are aromatic groups, R$_1$ and R'$_1$ can be the same or different inert substituent groups such as alkyl groups having from 1 to 4 carbons atoms, aryl, halogen atoms, or alkoxyl radicals having from 1 to 4 carbon atoms, the c's are independently integers having a value of from 0 to 4, inclusive, and R$_2$ is representative of a bond between aromatic carbon atoms or is a divalent radical.

4. An article as defined in claim 3 wherein the dihydric phenol is selected from one or more of the following:

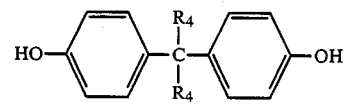

in which the R$_4$ groups represent independently hydrogen, lower alkyl, aryl and the halogen substituted groups thereof, which can be the same or different;

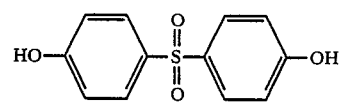

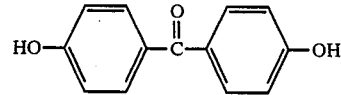

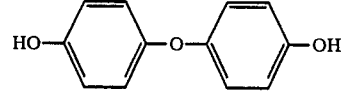

and substituted derivatives thereof.

5. An article as defined in claim 1 wherein the poly(aryl ether) has repeating units of the formula:

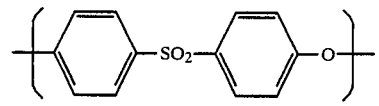

6. An article as defined in claim 1 wherein the poly(aryl ether) has repeating units of the formula:

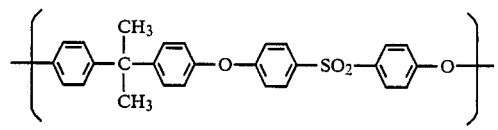

7. An article as defined in claim 1 wherein the poly(aryl ether) has repeating units of the formula:

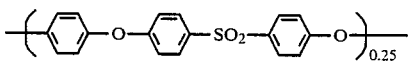

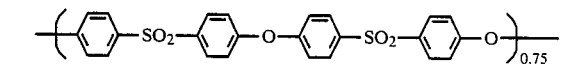

8. An article as defined in claim 1 wherein the polyarylate resin is derived from a dihydric phenol and at least one aromatic dicarboxylic acid.

9. An article as defined in claim 8 wherein the dihydric phenol is of the following formula:

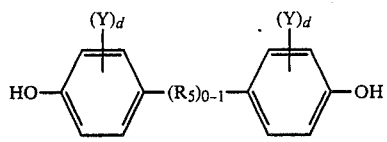

wherein Y is independently selected from, hydrogen, alkyl groups of 1 to 4 carbon atoms, chlorine or bromine, each d, independently, has a value of from 0 to 4, inclusive, and $R_5$ is a divalent saturated or unsaturated aliphatic hydrocarbon radical selected from an alkylene or alkylidene radical having from 1 to 6 carbon atoms, or a cycloalkylidene or cycloalkylene radical having up to and including 9 carbon atoms, O, CO, $SO_2$, or S.

10. An article as defined in claim 8 wherein the dicarboxylic acid is selected from terephthalic acid, isophthalic acid, or mixtures thereof.

11. An article as defined in claim 1 wherein the polyarylate is derived from bisphenol A and a mixture of isophthalic and terephthalic acids.

12. An article as defined in claim 1 which consists essentially of from about 70 to about 20 wt. percent of the polyarylate resin.

13. An article as defined in claim 1 which consists essentially of from about 35 to about 70 wt. percent of the poly(aryl ether) resin and from about 65 to about 30 wt. percent of the polyarylate resin.

14. An article as defined in claim 13 which additionally consists essentially of from about 5 to about 40 wt. percent of an aromatic polycarbonate resin.

15. A shaped article as defined in claim 1 in the form of a contact lens case, a test tube, a bottle, a medical device or instrument, a waste container, a food service article or cookware.

* * * * *